(12) United States Patent
Sarvestani et al.

(10) Patent No.: US 9,317,818 B1
(45) Date of Patent: Apr. 19, 2016

(54) SYSTEM AND METHOD FOR USING A HYBRID SINGLE-PASS ELECTRONIC TICKET

(71) Applicants: Seyed Amin Ghorashi Sarvestani, Keppel Bay (SG); Babak Ghafari, Golden Agri Plaza (SG)

(72) Inventors: Seyed Amin Ghorashi Sarvestani, Keppel Bay (SG); Babak Ghafari, Golden Agri Plaza (SG)

( * ) Notice: Subject to any disclaimer, the term of this patent is extended or adjusted under 35 U.S.C. 154(b) by 0 days.

(21) Appl. No.: 14/595,671

(22) Filed: Jan. 13, 2015

(51) Int. Cl.
*G06K 5/00* (2006.01)
*G06Q 10/02* (2012.01)
*G06K 7/10* (2006.01)

(52) U.S. Cl.
CPC ............ *G06Q 10/02* (2013.01); *G06K 7/10415* (2013.01)

(58) Field of Classification Search
CPC ......... G06Q 10/00; G06Q 20/00; G06K 5/00; G06K 7/01; G06K 9/18; G06K 17/00; G06K 19/00; G06K 7/10
USPC ......... 235/382, 382.5, 375, 487, 462.09, 380, 235/384
See application file for complete search history.

(56) References Cited

U.S. PATENT DOCUMENTS

| | | | |
|---|---|---|---|
| 7,002,475 B2 | 2/2006 | Brady et al. | |
| 7,642,915 B2 | 1/2010 | Eckstein | |
| 7,701,346 B2 | 4/2010 | Lindsay et al. | |
| 7,750,792 B2 | 7/2010 | Smith et al. | |
| 8,174,388 B2 | 5/2012 | Lian et al. | |
| 8,215,546 B2 | 7/2012 | Lin et al. | |
| 8,350,702 B2 | 1/2013 | Copeland et al. | |
| 8,441,534 B2 | 5/2013 | Hubmer et al. | |
| 8,831,879 B2 | 9/2014 | Stamm et al. | |
| 2007/0271113 A1* | 11/2007 | Nelson et al. | 705/1 |
| 2008/0079582 A1 | 4/2008 | Alexis et al. | |
| 2008/0155564 A1* | 6/2008 | Shcherbina et al. | 719/318 |
| 2008/0252454 A1* | 10/2008 | Rodgers | 340/572.1 |
| 2010/0070312 A1* | 3/2010 | Hunt | 705/5 |
| 2010/0133339 A1 | 6/2010 | Gibson et al. | |
| 2011/0316674 A1 | 12/2011 | Joy et al. | |
| 2012/0290336 A1* | 11/2012 | Rosenblatt et al. | 705/5 |
| 2012/0324542 A1 | 12/2012 | McLaughlin et al. | |
| 2013/0124236 A1* | 5/2013 | Chen | 705/5 |
| 2013/0238459 A1 | 9/2013 | Pasha et al. | |
| 2013/0282536 A1* | 10/2013 | Mohazzabfar et al. | 705/30 |
| 2014/0091933 A1 | 4/2014 | Mohiuddin et al. | |
| 2014/0104061 A1 | 4/2014 | Luo et al. | |
| 2014/0125800 A1 | 5/2014 | Van Nest et al. | |
| 2014/0225734 A1 | 8/2014 | Rasband et al. | |
| 2015/0014412 A1* | 1/2015 | Sulavik et al. | 235/380 |

FOREIGN PATENT DOCUMENTS

| | | |
|---|---|---|
| WO | WO2009035886 | 3/2009 |
| WO | WO2012057811 | 5/2012 |
| WO | WO2013165683 | 11/2013 |
| WO | WO2014046760 | 3/2014 |
| WO | WO2014134443 | 9/2014 |

* cited by examiner

Primary Examiner — Edwyn Labaze
(74) Attorney, Agent, or Firm — Emerson Thomson Bennett, LLC

(57) ABSTRACT

Provided is a system for generating and validating a hybrid single-pass electronic ticket. The system includes a physical ticket having at least one Electronic Article Surveillance (EAS) Radio Frequency (RF) tag and a two dimensional code; at least one validator having an Electronic Article Surveillance (EAS) Radio Frequency (RF) transceiver and a scanner for reading the two dimensional code. The system generates the hybrid single-pass electronic ticket by printing the two dimensional code containing associated ticket information on the electronic ticket and validates the electronic ticket by reading the EAS RF tag and the two dimensional code on the ticket.

25 Claims, 7 Drawing Sheets

SYSTEM AND METHOD FOR USING A HYBRID SINGLE-PASS ELECTRONIC TICKET

I. BACKGROUND

A. Technical Field

Provided is a system and method for issuing or producing a single-pass electronic ticket which is to be presented for authorization prior to entering vehicles, transportation systems or specific establishments or places. The system and method may be used as a means to provide individuals with access or entry into public or private transportation systems or any public or private establishment or venue.

B. Description of Related Art

Conventional one-pass tickets mainly use technologies such as magnetic strips, barcodes, and Radio Frequency Identification Code (RFID) chips (e.g., MIFARE Classic and MIFARE Ultralight) to store relevant ticket and purchase information for validation at the point of entry for access to a transportation system or to a particular event, location or other venue.

One of the cheapest forms of electronic ticketing solutions is the use of magnetic tickets. Magnetic tickets are widely used by operators of mass public transport systems as well as for entry into specific events, locations and establishments. Magnetic tickets store data on magnetic tracks present on the front or backside of the ticket. A reader is used to read and write data on the magnetic strips incorporated within these tickets. The reader typically requires a relatively complex mechanical movement wherein the ticket is passed through electronic sensors to perform a read/write operation. This read/write operation is necessary to validate the ticket and return it to the passengers, patrons or customers. This mechanical complication is high maintenance and increases both the cost of ownership as well as the cost of operation. It also reduces or limits availability of access to within a certain time frame for use, which may be desirable for use in mass public transportation systems.

Another type of electronic ticketing solution is the use of contactless cards such as smart cards. Contactless cards utilize Radiofrequency Identification (RFID) chips. These chips are more expensive than magnetic tickets. However, the corresponding validators of RFID chips are much simpler and low maintenance compared to magnetic tickets. They are also more reliable and more readily available than magnetic tickets. Another advantage of using contactless cards, as an electronic ticketing solution is that contactless validators can be used to read/write the contactless cards from a close proximity without the need of any physical contact between the card and the reader. Moreover, the read/write operation can be performed in a fraction of a second. Also, because of the ability to read and write data directly from the RFID chips, operators can run the validators in a semi-online or fully offline mode which may further ensure customers of the security of the fee collection and validation process.

Another alternative low cost solution to magnetic tickets is the barcode media. Among the different barcode forms, QR codes (Quick Response codes) are of interest because of its fast readability and great storage capacity. QR codes are emerging as an alternative technology in payment systems. This technology is becoming popular in the field of mobile payments and electronic ticketing solutions. The cost of producing electronic tickets with QR codes is among the lowest in the industry compared to the other ticketing solutions. One of the disadvantages of utilizing QR codes, however, is that validation of the printed code in public transport systems requires a fully online infrastructure. The main reason for this online infrastructure is due to writing limitations of QR code readers. QR code readers are only able to read code. They are unable to write anything on the tickets. This represents a major limitation to their day-to-day use. In addition, there is a high risk that electronic ticket utilizing QR codes may be fraudulently copied, as it is relatively easy to do so. These two disadvantages are major obstacles to deploying a semi-online or fully offline solution for QR codes. Developing a semi-online or fully offline infrastructure for fare collections utilizing QR codes or any other type of two dimensional code system, however, can provide a basic level of security against fraud and is desirable for use in public/private transportation fare collection systems as well as fare collection systems for other establishments and venues.

Thus, there is a need for a single-pass ticketing solution, which incorporates the type of read/write operations necessary to enable operators to deploy an electronic ticketing system in a semi-online or fully offline infrastructure and which also provides a very low cost electronic ticketing solution.

II. SUMMARY

Provided is a system for generating a hybrid single-pass electronic ticket. The system includes a physical ticket having at least one Electronic Article Surveillance (EAS) Radio Frequency (RF) tag; at least one validator comprising a processor for performing computing operations and an Electronic Article Surveillance (EAS) Radio Frequency (RF) transceiver, wherein the validator receives ticket information related to the purchase of the electronic ticket, the EAS RF transceiver detects the EAS RF tag embedded within the electronic ticket and associates the EAS RF tag with the received ticket purchase information, and wherein the validator encrypts the ticket purchase information received and information related to the EAS RF tag within a two dimensional code; and a printer which receives a signal transmitted from the validator to print the two dimensional code generated by the validator directly on the electronic ticket.

According to one aspect of the disclosed system, the system further includes a main server and/or a local server for processing a list of valid and/or invalid electronic tickets and wherein the validator further comprises software and controllers for entering and processing data; at least one communication port for communicating with the main server and/or local server and the printer; memory for storing ticket purchase information within a database; and a validator control board for housing and connecting the processor, memory and controllers to a bus.

According to another aspect of the disclosed system, the two dimensional code is one of Aztec code, barcode, mCode, QR code, ColorCode, Color Construct Code, CrontoSign, CyberCode, DataGlyphs, Data Matrix, DataStrip Code, EZcode, digital paper, High Capacity Color Barcode, HueCode, InterCode, MaxiCode, mobile multi-colored composite (MMCC), NexCode, PDF417 (Portable Data File), Qode, ShotCode and SPARQCode. According to a further aspect of the disclosed system, the two-dimensional code is a QR code.

According to another aspect of the disclosed system, the validator includes a first communication port comprising an Ethernet port for communicating with the main server and a second communication port comprises an RS 232 serial port or a Universal Serial Bus (USB) port for transmitting a signal from the validator to the printer to print the QR code on the electronic ticket.

According to another aspect of the disclosed system, the validator includes an input for entering ticket purchase information.

According to another aspect of the disclosed system, the validator receives ticket purchase information through a signal received by the communication port transmitted from an input device.

According to another aspect of the disclosed system, the communication port is a wireless communication port through which the validator may communicate with the main server and the printer.

According to another aspect of the disclosed system, the signal through which the ticket purchase information is transmitted from the input device is a wireless signal and the communication port which receives ticket purchase information transmitted from the input device is a wireless communication port.

According to another aspect of the disclosed system, the validator transmits a signal through the communication port to the main server and the signal includes ticket purchase information related to at least one purchased ticket's serial number.

According to another aspect of the disclosed system, the main server receives ticket purchase information related a plurality of purchased ticket's serial numbers from multiple validators or ticket issuers, the main server processes the ticket purchase information to generate a list of valid ticket serial numbers and the main server transmits the list of valid ticket serial numbers through a signal which is sent to multiple validators within the system at pre-defined time intervals allowing all validators within the system to be synchronized with respect to the list of electronic tickets which have been issued and are valid.

According to another aspect of the disclosed system for generating a hybrid single-pass electronic ticket, the system is operated in a semi-offline or offline mode.

According to another aspect of the disclosed system, the electronic ticket includes at least two EAS RF tags which are read at different radio frequencies and the information related to the specific radio frequencies for reading the at least two EAS RF tags is encrypted within the QR code.

Also provided is a system for validating a hybrid single-pass electronic ticket. The system includes: a physical ticket having at least one Electronic Article Surveillance (EAS) Radio Frequency (RF) tag and a two dimensional code; at least one validator comprising a processor for performing computing operations, a memory, a scanner and an Electronic Article Surveillance (EAS) Radio Frequency (RF) transceiver, wherein the scanner reads information from the two dimensional code on the electronic ticket, the validator decrypts information embedded within the two dimensional code and compares it to a list of valid or invalid purchased ticket information stored on the memory of the validator; the validator obtains a specific radio frequency for communicating with the at least one EAS RF tag and wherein the EAS transceiver uses the obtained radio frequency for communicating with the EAS RF tag to validate or deny validation of the electronic ticket.

According to one aspect of the disclosed system, the system further includes a main server for processing a list of valid and/or invalid electronic tickets and the validator further includes software and controllers for entering and processing data; at least one communication port for communicating with the main server; and a validator control board for housing and connecting the processor, memory and controllers to a bus.

According to another aspect of the disclosed system, the two dimensional code is one of Aztec code, barcode, mCode, QR code, ColorCode, Color Construct Code, CrontoSign, CyberCode, DataGlyphs, Data Matrix, DataStrip Code, EZcode, digital paper, High Capacity Color Barcode, Hue-Code, InterCode, MaxiCode, mobile multi-colored composite (MMCC), NexCode, PDF417 (Portable Data File), Qode, ShotCode and SPARQCode. According to a further aspect of the disclosed system, the two-dimensional code is a QR code.

According to another aspect of the disclosed system, the validator includes a communication port for communicating with the main server or the local server and the communication port is one of an Ethernet port or a wireless communication port.

According to another aspect of the disclosed system, the validator receives a key transmitted by the main server, which is subsequently used by the validator to decrypt the QR code.

According to another aspect of the disclosed system, validation of the electronic ticket is completed by the EAS transceiver transmitting a radio frequency signal to the EAS RF tag, which destroys a capacitor embedded within the EAS RF tag. In certain embodiments, the EAS transceiver validates the electronic ticket by transmitting a radio frequency signal to the EAS RF tag. The EAS RF transceiver senses a change in power based on the reflected radio frequency signal and transmits information stored within the EAS RF tag to the validator using the reflected signal information. After the validator receives and validates the information received from the EAS RF tag, it utilizes the EAS transceiver to transmit a stronger radio frequency signal to the EAS RF tag to destroy the capacitor embedded within the EAS RF tag prior to validation to prevent the electronic ticket from being reused.

According to another aspect of the disclosed system, the EAS transceiver denies validation of the electronic ticket by transmitting a radio frequency signal to the EAS RF tag and sensing that a capacitor embedded within the EAS RF tag has already been destroyed. This may be accomplished by the EAS transceiver sensing the power of a radio frequency signal reflected from the inactivated EAS RF tag.

According to another aspect of the disclosed system, validation of the electronic ticket is accompanied by an indication on the validator which provides that passage by an individual presenting the ticket is permitted and wherein denial of validation of the electronic ticket is accompanied by an indication on the validator which provides that passage by the individual presenting the ticket is not permitted.

According to another aspect of the disclosed system, the validator transmits a signal to a gate to open where the electronic ticket has been validated and the Validator transmits a signal to a gate to remain closed in the event that the electronic ticket has been denied validation.

According to another aspect of the disclosed system, the validator stores ticket information related to validated tickets and ticket information related to tickets, which have been denied validation within its memory and transmits such ticket information to the main server, thereby allowing the main server to update its list of valid and invalid tickets which have been issued.

According to another aspect of the disclosed system for validating a hybrid single-pass electronic ticket, the system is operated in a semi-offline or offline mode.

Also provided is a system for generating and validating a hybrid single-pass electronic ticket. The system includes a physical ticket having at least one Electronic Article Surveillance (EAS) Radio Frequency (RF) tag and a two dimensional code; at least one validator comprising a processor for performing computing operations, a memory, a scanner and an Electronic Article Surveillance (EAS) Radio Frequency (RF) transceiver, wherein the validator generates the electronic ticket by receiving ticket information related to the purchase of the electronic ticket, utilizing the EAS RF transceiver to read the EAS RF tag embedded within the electronic ticket, associating the EAS RF tag with the received ticket purchase information, encrypting the ticket purchase information received and information related to the EAS RF tag within a two dimensional code and sending a signal to a printer to print the two dimensional code directly on the electronic ticket; and wherein the validator validates the electronic ticket by utilizing the scanner to read ticket purchase information from the two dimensional code on the electronic ticket, decrypting the information embedded within the two dimensional code, comparing the information decrypted from the two dimensional code with a list of valid or invalid purchased ticket information stored on the memory of the validator; decrypting specific radio frequency information required for reading the at least one EAS RF tag from the two dimensional code; utilizing the EAS transceiver and the decrypted radio frequency to send a corresponding radio frequency signal to communicate with the EAS RF tag; and validating or denying validation of the electronic ticket based on the results of the EAS transceiver communication with the EAS RF tag.

III. BRIEF DESCRIPTION OF THE DRAWINGS

IV. DETAILED DESCRIPTION

Figure 1:
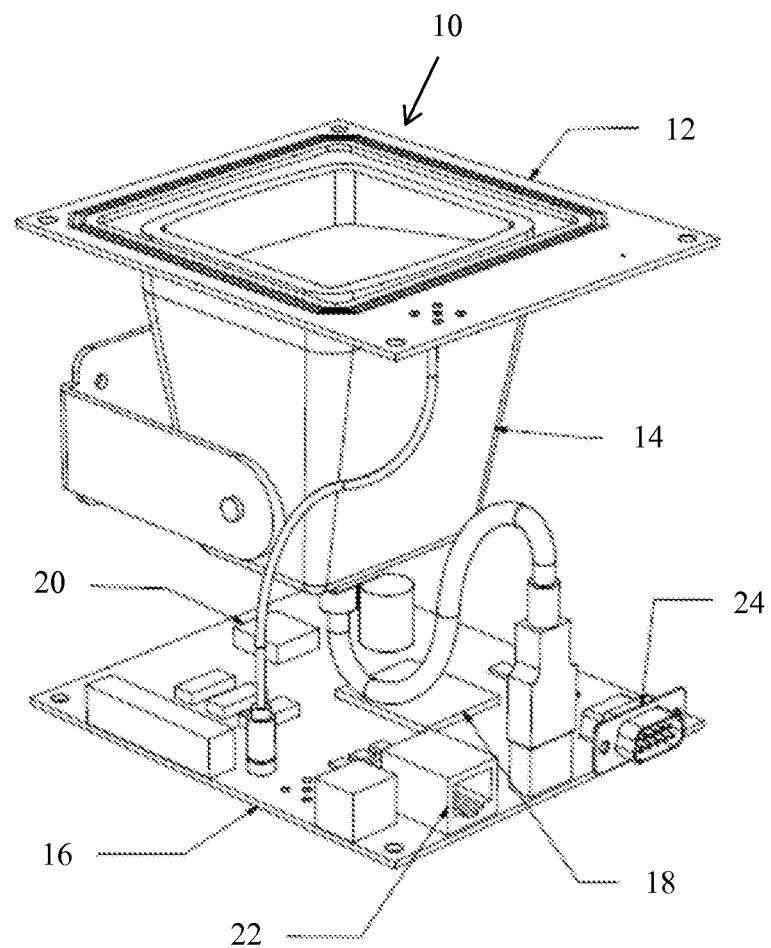
FIG. 1 is a perspective view of an exemplary validator.

Provided is a system and method for generating and validating a hybrid single-pass electronic ticket. The system and method may be used as a means to provide individuals with access or entry into public or private transportation systems or any public or private establishment or venue. Non-limiting examples of public transportation systems include metro systems such as buses, tramways, subways, trains and trolleys. Non-limiting examples of public or private establishments or venues include any place requiring a ticket for entry such as sport stadiums, arenas, museums, concert halls, clubs, amusement parks, recreational parks, parking garages, toll booths, etc.

The disclosed system and method includes the use of devices which incorporate a combination of a two dimensional code and Electronic Article Surveillance (EAS) Radio Frequency (RF) tag technology in a single-pass electronic ticket. These types of single-pass electronic tickets allow for low cost operation of an electronic ticketing system which can operate within a semi-online or fully offline infrastructure. The disclosed system and method renders the electronic tickets generated difficult to copy and eliminates the possibility of fraud.

Electronic Article Surveillance (EAS) is a technological method, which fixes electronic tags to articles. The electronic tags provide a level of security to the articles they are fixed to and are used to prevent fraud or theft. The electronic tags can be detected and deactivated at any particular point in time by the retailer or issuer of the electronic tag. Detection and deactivation of EAS tags is typically accomplished by a validator, which uses a transceiver to detect the tag and communicates with the tag through the transmission of radio frequency signals.

In certain embodiments, the transceiver communicates with the EAS tag through the transmission of electro-magnetic signals or radio frequencies. This allows for contactless detection of the EAS tag. In cases where the transceiver uses radio frequencies to detect the EAS tags, the EAS tags typically incorporate the use of simple inductor-capacitor (LC) tank circuits that have a resonance peak frequency. In such cases, the transceiver when set to the resonance frequency, detects the tag. The transceiver can then employ the use of a stronger electromagnetic field to destroy the capacitor within the tag in order to deactivate the tag. EAS tags are relatively inexpensive and cost effective compared to other solutions and their relatively simple concept makes them an ideal product for mass production. Thus, in certain embodiments, the disclosed system and method for issuing or generating and validating electronic tickets utilizes Electronic Article Surveillance (EAS) Radio Frequency (RF) tags.

The disclosed system and method includes two sides with respect to the ticketing system. The first side of the system issues the electronic tickets to customers who purchase the ticket and is referred to as the issuer. The second side of the system receives and validates the electronic ticket when a customer presents the electronic ticket for entry within or exit from a transportation system (e.g., a public mass transportation system), establishment or other venue and is referred to as the receiver. Both the first side and second side of the system incorporate the use of a validator to generate and validate the electronic ticket. In certain embodiments, the issuer and/or receiver may be an individual. In other embodiments, the issuer and/or receiver may be an automated machine containing a validator which functions as an issuer and/or a receiver.

In order to issue a single-pass electronic ticket, the issuer of the ticket or first side of the system utilizes a validator to print a two dimensional code on an inactivated paper ticket which has at least one embedded EAS tag. Non-limiting examples of two-dimensional codes which may be printed on and utilized with the electronic ticket include Aztec code, barcode, mCode, QR code, ColorCode, Color Construct Code, CrontoSign, CyberCode, DataGlyphs, Data Matrix, DataStrip Code, EZcode, digital paper, High Capacity Color Barcode, HueCode, InterCode, MaxiCode, mobile multi-colored composite (MMCC), NexCode, PDF417 (Portable Data File), Qode, ShotCode and SPARQCode. In certain embodiments, the two-dimensional code printed on and utilized with the electronic ticket is a QR code.

The two dimensional code (hereinafter referred to as the QR code for convenience) is generated by the issuer according to an encryption method. Non-limiting examples of encryption methods, which may be utilized to generate the QR code include Advanced Encryption Standard (AES) and Data Encryption Standard (DES). The encryption process includes the generation of encryption keys which are associated with the two dimensional code. An issuer validator may accomplish generation of the encryption keys and QR code. In certain embodiments, a specific encryption key is associated with a specific QR code on an electronic ticket whereas in other embodiments, a generic encryption key may be associated with different QR codes on multiple tickets. The encryption keys are known only to those individuals or devices, which generate or issue the electronic ticket and to those individuals or devices, which receive and validate the electronic ticket within the system. Information related to the encryption keys generated by the issuing validator may be transmitted to a receiver validator or placed in a secure access module (SAM) within the validator, which validates the electronic ticket through a semi-offline or fully offline connection. In alternative embodiments, encryption keys generated by the issuing validator may be uploaded to a main server. These encryption keys may then be retrieved or downloaded by the receiver validator upon request by the receiver validator or upon synchronization of multiple validators within the system with the main server. Such synchronization may occur at pre-determined or fixed time intervals. In further alternative embodiments, encryption keys may be transferred manually by individuals operating the issuing validator to individuals operating the receiver validator through a semi-offline or fully offline communication or verbally.

The second side within the system, which receives and validates the electronic ticket, uses a Validator to read and validate the QR code. The validator includes a scanner or reader which reads the two dimensional code (e.g., a QR code reader) and a processor to validate the two dimensional code. The second side within the system may consist of a gate, which contains the validator. In such embodiments, the ticket holder would present the electronic ticket to the validator within the gate for validation. In alternative embodiments, the second side of the system may employ a teller who operates a portable validator. In such embodiments, the ticket holder would present the electronic ticket to the teller who would use the validator for validation. Thus, the hybrid single-pass electronic ticket includes two levels of security. The first level of security includes the use of EAS technology, which prevents the electronic ticket from being copied. The second level of security includes the encryption of the ticket information within the two dimensional code.

Each ticket contains a set of information. Such ticket information includes but is not limited to a unique ticket serial number, the frequencies of the EAS tags, the details of the issuer (e.g., issuer's name and location), the details of the purchaser (e.g., purchaser's name and billing information), the time and date of issuance of the ticket, the validity of ticket, and the details of the fee or fare scheme (e.g., whether the fee or fare scheme is based on a flat fee, a fee for traveling within a certain zone or a particular time-frame or an origin-destination fee based on the distance traveled). These details are all are coded and encrypted within the two dimensional code.

The validation process of the ticket will be performed by the validator as follows. First, when the ticket is presented to the validator, the validator reads the two dimensional code (e.g., QR Code) and decrypts the code according to the encryption method utilizing the keys stored within the validator's memory or inside a secure access module (SAM). Decrypting the two dimensional code enables the validator to obtain the specific radio frequency of the EAS RF tag embedded within the ticket. Once the transceiver obtains the specific EAS RF tag radio frequency, it can utilize this frequency to check for the presence of the EAS RF tag within the ticket. The transceiver accomplishes this by sending a radio frequency wave to the EAS RF tag on the ticket. If the EAS RF tag is available, and if the conditions of a valid two dimensional code and presence of the correct frequency for the EAS RF tag are both passed successfully, the transceiver then deactivates the EAS RF tag and validator validates the ticket. Validation of the ticket is then followed by the individual being allowed access or entry to or exit from a transportation system or venue, for example by opening a gate. Once the electronic ticket is validated, the serial number of the validated ticket is sent, along with other information, such as the gate identification number, time and date of validation, etc., to the main server.

Once a ticket is validated, it will not be able to be validated and used within the system again. For example, deactivation of the EAS RF tag within the electronic ticket prevents the electronic ticket from being subsequently validated by the system again. This is because deactivation of the EAS RF tag within the electronic ticket results in destruction of the capacitor within the EAS RF tag. Consequently, anyone who may present the electronic ticket again after the original validation would not be able to have the ticket re-validated with the same EAS RF tag. This feature precludes individuals from using the same ticket to fraudulently gain access or entry to or exit from a transportation system, an establishment or other venue. Thus, the validator will automatically reject any electronic ticket, which does not include an active EAS RF tag. The Validator will also reject any ticket which does not include a valid two dimensional code or the correct radio frequency stored within the two dimensional code for the EAS RF tag.

The system and method for using the disclosed hybrid single-pass electronic ticket includes the following components: a) a paper ticket which includes one or more embedded EAS tags and an encrypted two dimensional code printed on it; and b) a validator which includes a scanner or camera to read the two dimensional code and an EAS RF transceiver to detect and deactivate the EAS tags. For convenience of reference, the term "scanner" when used alone herein shall be interpreted to also include the term "camera" to be within the scope of its meaning.

A. Ticket

In certain embodiments, the electronic ticket is a paper ticket, which includes one or more EAS RF tags with different frequencies. Ticket information may be printed directly onto the electronic ticket by encrypting the ticket information within a QR code and printing the QR code directly onto the electronic ticket by a printer.

The two dimensional code (e.g., QR code) provides an efficient method to validate electronic tickets and reading the two dimensional code by the Validator is fast and contactless. Two dimensional codes also provide for a secure method for issuing electronic tickets in that all vital information related to the purchase and issuance of the electronic ticket is encrypted within the two dimensional code. In addition, the possibility for fraud by individuals who may attempt to copy the printed two dimensional Code or who may wish to hack into the system is limited in that the present system and method utilizes an offline or semi-online fare collection solution. Thus, the present system and method utilizes an embedded EAS RF tag to prevent fraud and adds another layer of security by providing a semi-online of an offline fare collection system based on the printed two dimensional code. The combination of utilizing an EAS RF tag and a two dimensional code within a single electronic ticket is known as a hybrid single-pass electronic ticket.

The disclosed system and method utilizes an EAS RF tag transceiver to read and transmit signals to the EAS RF tag and a two dimensional code reader to read the two dimensional code. The hybrid ticket validator recognizes and validates both the QR code using a decryption method and also the related EAS RF tag embedded in the ticket. The hybrid ticket transceiver also operates to cancel a ticket by simply destroying the EAS RF tag embedded within the electronic ticket. This is accomplished by transmitting the appropriate strong radio frequency wave, which is unique to the EAS RF tag at issue, to destroy the capacitor within the EAS RF tag. Information related to the particular radio frequency required to destroy the EAS RF tag may be encrypted within the two dimensional code by the issuer and may be retrieved by decrypting the two dimensional code by the validator. By utilizing EAS RF tags having a unique radio frequency within each electronic ticket, another level of security is added to the system. This feature enables the issuer to choose different frequencies for different working days or different areas, zones or venues. It also enables the issuer to incorporate more than one EAS RF tag on a single ticket for different applications. For example, an electronic ticket containing two or more EAS RF tags may be used for validating multiple trips within a public mass transportation system.

B. Validator

The validator includes a processor, memory (including random access memory or RAM and read-only memory or ROM), communication ports, a scanner or camera, an EAS RF tag transceiver and accompanying proprietary software. The processor and proprietary software in the validator control the operation of the scanner/camera, EAS RF tag transceiver and communicates with a main server through a semi-offline or a fully offline connection. The memory within the validator stores ticket information and all the other relevant information. The scanner/camera within the validator reads the two dimensional code and the EAS RF tag transceiver reads the EAS tags on the ticket. The EAS tag transceiver is capable of operating in different frequencies. Accordingly, the EAS tag transceiver can detect, read and validate tags with different radio frequencies. This function providers issuers with the capability of issuing different types of tickets wherein each type of ticket is characterized and distinguished by a specific radio frequency assigned to the EAS RF tag. Electronic tickets having tags which function in different frequencies can be used by ticket issuers to assign different tickets for different working days, for different areas or zones of travel within a transportation system, for different events, for different seating arrangements or for any other classification that may be contemplated. This feature of issuing electronic tickets having a specific radio frequency assigned to the EAS RF tag for a particular day, area, event, seating arrangement, etc. increases the level of security and reduces the possibility for fraud as it becomes more difficult for individuals to replicate tickets having the correct radio frequency assigned to the EAS RF tag. This function also enables ticket issuers to issue electronic tickets having more than one EAS RF tag, wherein each EAS RF tag operates at a different radio frequency. In such cases, the EAS RF tag transceiver is capable of differentiating and recognizing multiple EAS RF tags embedded within a single electronic ticket based on the different radio frequencies assigned to each EAS RF tag. This feature can allow holders of electronic tickets, to use a single ticket multiple times to gain entry to or exit from a transportation system, establishment or other venue. For example, a holder of a single electronic ticket for a trip on a subway may purchase a ticket having two EAS RF tags, which operate at different radio frequencies. The ticket would be read by an EAS RF tag transceiver at a first radio frequency to deactivate the first EAS RF tag embedded within the ticket, thereby validating the ticket. This would allow the ticket holder to gain access to the subway and travel to a particular location. The ticket holder may then desire to return to his or her initial start point or to travel to a different location. In such cases, the ticket holder would present the same ticket. An EAS RF tag transceiver would then read the same ticket at a second radio frequency to deactivate the second EAS RF tag embedded within the ticket, thereby validating the ticket. This will allow the ticket holder to gain access to the subway system and return to the initial start point or travel to a different locality.

Thus, the system and method disclosed herein operates as an efficient and affordable solution for mass public transportation electronic ticketing. It can be used with any type of fare collection method (e.g., cash, credit, debit, etc.). It can also be used to operate any type of transportation system, building or other venue access control system without requiring an online infrastructure.

Now, the system and method disclosed herein will be described from the perspective of the ticket issuer. First, the issuer obtains a stack of electronic paper tickets having an EAS RF tag embedded therein. When a customer purchases an electronic ticket of the type described herein, the issuer first obtains a paper ticket having an EAS RF tag embedded therein. The issuer then asks the customer a series of questions relating to the purchase of the ticket. For example, the issuer may ask for the customer's name, address or other identifying information, the type of services requested (e.g., in the case of mass transportation system, the issuer may ask the customer for information related to the desired destination, duration or time frame of the trip or how many trips are desired), payment information and any other information related to the purchase of the electronic ticket. The issuer then receives the ticket information from the customer. After receiving the ticket information, the issuer processes the information, encrypts the information within a two dimensional code, stores the two dimensional code within a database and prints the two dimensional code directly onto the electronic ticket. Information encrypted within the two dimensional code is known only by the issuer of the ticket and the Validator which will read and validate the ticket when it is presented by the ticket purchaser for access to the transportation system, establishment or other venue. After the customer purchases the ticket, he or she will validate it at the gate by presenting it to a validator, which receives the activated ticket. The validator will read the two dimensional code and decrypt it utilizing a key received from the main server or the issuer validator. The Validator will then extract the ticket serial number and its EAS tag frequency information. In the case of using the white list method (described below), the Validator next compares the ticket serial number with the list of the valid ticket serial numbers, which have been received from the main server and stored within the memory storage of the receiver validator. If the serial number is validated, the validator will proceed with deactivating the EAS RF tag embedded within the ticket. After the electronic ticket is validated, the validator may transmit a signal to a gate or access point causing the gate or access point to open allowing the ticket holder to pass through. For example, in certain embodiments, the ticket holder may be a passenger who gains access to a transportation system such as a subway by the opening of a gate.

In certain embodiments, the electronic ticket may have multiple (e.g., two or more) EAS RF tags. These types of tickets may be used in transportation systems. For example, such tickets may, in certain embodiments, be used to allow ticket holders to gain entry to multiple access points within a particular zone or area within a transportation system. These types of tickets may also be used to allow ticket holders to gain entry to multiple access points within an allotted time frame for travel within the transportation system.

In certain embodiments, the electronic ticket may have two EAS RF tags. Each EAS RF tag may be assigned to a particular zone or origin-destination point. In such embodiments, the issuer registers the details or information related to the ticket purchase and encrypts this information within the two dimensional code. The issuer also assigns the radio frequency of both EAS RF tags within the electronic ticket to the registered information embedded within the two dimensional code and encrypts information related to the proper radio frequency for the EAS RF tags within the two dimensional code. When the electronic ticket is presented to the validator at the gate, the validator will read and decrypt the two dimensional code to obtain the proper radio frequency for one of the EAS RF tags. The validator's transceiver will then transmit this specific radio frequency to one of the EAS RF tags within the ticket to destroy the targeted EAS RF tag which has been assigned for the particular origin-destination or zone point station and leave the other EAS RF tag to be destroyed at time of presenting the ticket at a second origin-destination or zone point station. This enables the ticket holder to have a valid ticket during the journey. The validity of these types of tickets may also be checked by the inspectors during the ride.

In another embodiment, the electronic ticket could be designed for use within a time period fare scheme. In such embodiments, the beginning and ending time period upon which a purchaser may use the electronic ticket is registered and stored within the memory of the server. The beginning and ending time period is also encrypted, stored within the two dimensional code and assigned to a particular radio frequency for an EAS RF tag embedded within the electronic ticket. When the ticket holder presents the ticket, the validator decrypts the two dimensional code and then checks the ticket for the presence of the EAS RF tag. The validator then validates the ticket without destroying the tag. This is accomplished by transmitting a radio frequency sufficient to read and sense the EAS RF tag but below the threshold required to destroy the capacitor within the EAS RF tag. The EAS tag will remain active until the end of the time period of the validity of the ticket. In cases where this type of electronic ticket is used for transportation systems, the passenger can use the same ticket to access the transport network as many times as he or she desires. At the end of the designated time period, presenting the ticket to any validator will initiate the process of destroying the EAS tag and voiding the ticket.

The system is capable of operating in a semi-online or a fully offline mode. In certain embodiments, validators used within the system connect to the main server to synchronize themselves with the main server at predefined time intervals. During the synchronization process, the validators will receive the encryption keys, a list of valid and invalid ticket numbers (white and black list) or any other information required for their operation in offline mode. The validators may also upload and transfer a list of tickets which have been validated along with other corresponding information (such as date, time, location, etc.) related to the validation of such tickets to the main server for updating the ticket database as well as for other administrative or reporting purposes.

In order to increase the security level of the disclosed system and method, the validation process may use at least one of two different methods in order to validate or reject the tickets. The first method incorporates the use of a black list. In the black list method, the validator validates the electronic ticket according to the above-described process. The validation process is limited to correct decryption of the encrypted data in two dimensional code. After validating the electronic ticket, the validator sends the validated ticket information to the main server to add to the black list. The main server stores the validated ticket information and ensures that tickets stored on the black list are not subsequently validated again. In the white list method, the main server transfers a list of issued or valid ticket serial numbers or identifying information to the validators within the system. When the ticket holder presents an electronic ticket to one of the validators within the system, the validator validates the electronic ticket according to the above-described process. After the electronic ticket has been validated, the ticket serial number or other identifying information decoded from the two dimensional code is compared with the list of the valid ticket serial numbers or other identifying information stored in the validator's memory. If the serial number or other identifying information from the electronic ticket presented to the validator matches the ticket serial number or other identifying information stored within the validator, the validator will proceed with allowing the purchaser entry or exit from a transportation system, establishment or other venue, for example by opening a gate.

In both the black list method and the white list method, the validator will reject tickets which do not have a valid or active EAS RF tag. This ensures that once a ticket is validated and the EAS RF tag is deactivated, it will not be possible to validate that same ticket again whether the system is operating in an offline or a semi-online mode.

In both the black and white list methods, the validators' lists are updated by the main server in predefined time intervals and all of the validators' lists are synchronized across the system in predefined time intervals. In other embodiments, the validators' lists may be updated without the use of a main server by synchronizing the black or white lists within the validators directly with other validators within the system. The black and white list methods do not require a full or fast online infrastructure. Rather, a semi-online is sufficient to operate such a system. This feature enables a very high security level to be maintained and minimizes the possibility of fraud. In embodiments which utilize a fully offline platform, validation of the electronic tickets is accomplished by verifying the encryption and coding of data present within the two dimensional code and the EAS tag.

Figure 2:
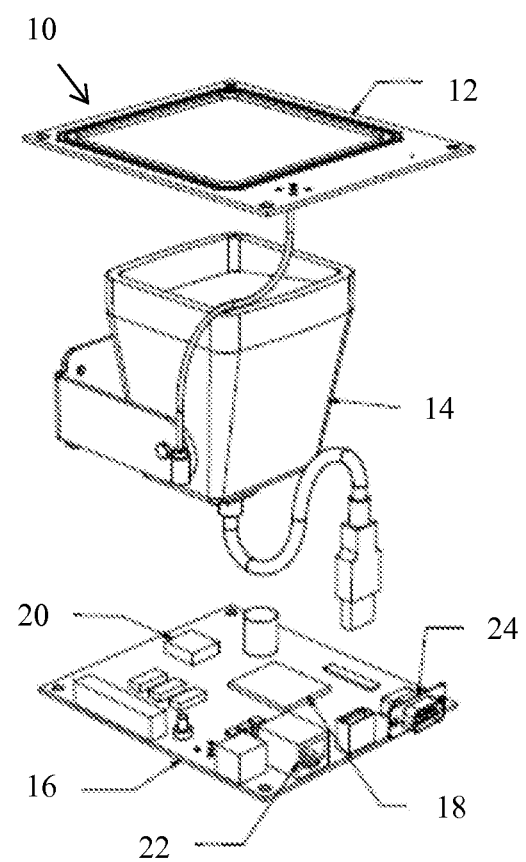
FIG. 2 is an exploded perspective view of an exemplary validator.
Figure 4:
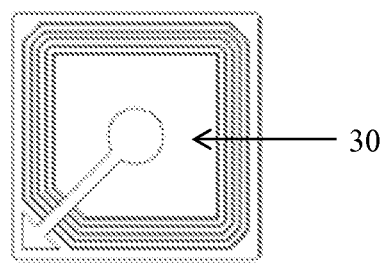
FIG. 4 is a detailed planar view of an exemplary Electronic Article Surveillance (EAS) Radio Frequency (RF) Tag, which may be embedded within an electronic ticket.
Figure 5:
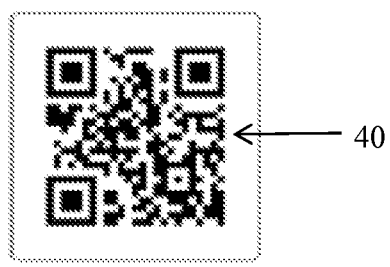
FIG. 5 is a detailed view of an exemplary Quick Response (QR) code, which may be printed on an electronic ticket.
Figure 6:
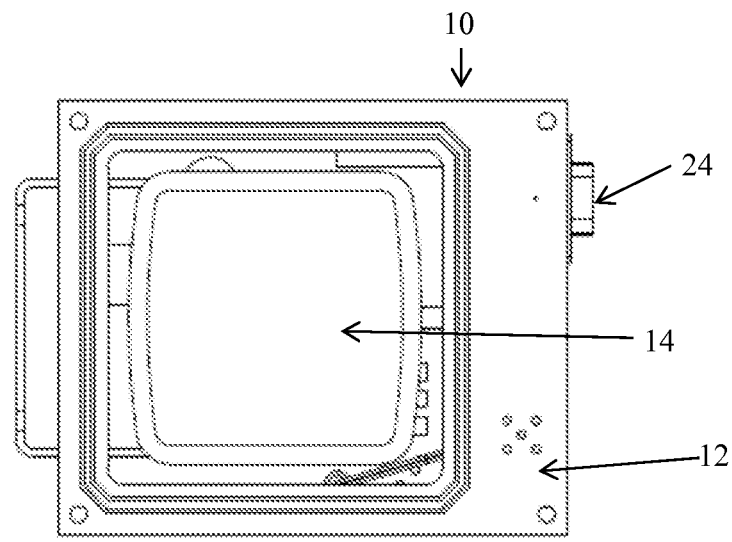
FIG. 6 is a top view of an exemplary validator.
Figure 7:
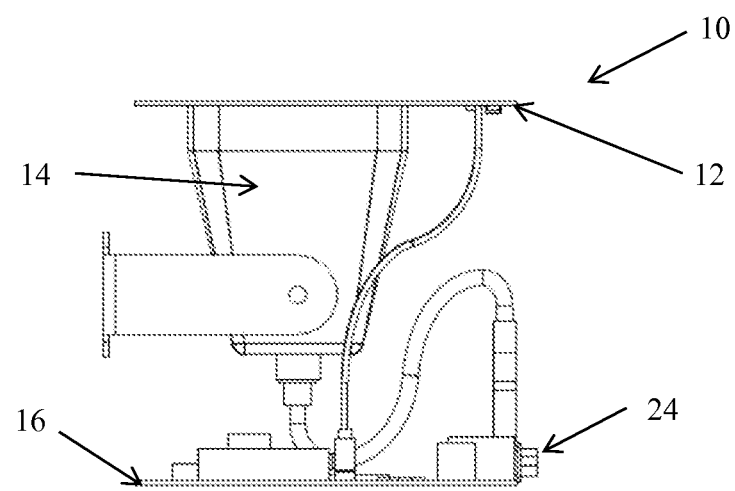
FIG. 7 is a side view of an exemplary validator.
Figure 8:
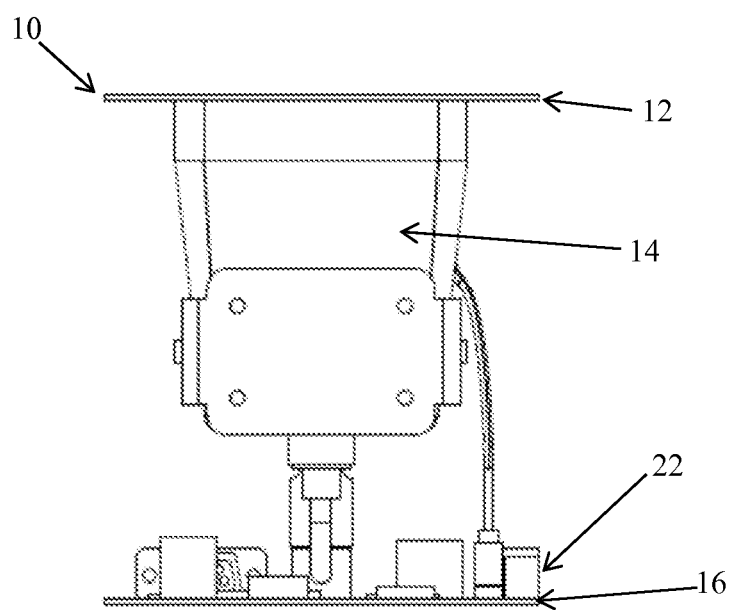
FIG. 8 is a side view of an exemplary validator.

The disclosed system and method incorporates the use of various system components illustrated within FIGS. 1 through 8. An exemplary validator which may be utilized in the disclosed system and method is illustrated within FIGS. 1, 2 and 6-8. FIGS. 1 and 2 illustrate a perspective and an exploded view of the component parts of an exemplary validator (10) respectively. FIGS. 6 through 8 illustrate a top view and side views of an exemplary validator (10). More particularly, FIGS. 1 and 2 illustrate the internal structural components of an exemplary validator which may utilized in the disclosed system and method. The validator (10) includes a processor (18) for performing computing operations, a memory (20) for storing ticket purchase information within a database as well as a memory for operation of the processor, software and controllers (not shown) for entering and processing data and a validator control board (16) for housing and connecting the processor memory and controllers to a bus (i.e., the communication system including all hardware components, such as wire and optical fibers, software and communication protocols that transfer data between components within the validator). A camera or scanner (14) is used to read information from a two dimensional code on an electronic ticket. The Validator (10) decrypts information embedded within the two dimensional code and compares it to ticket information found within the black or white list which is stored in the memory (20) of the validator (10). One of the pieces of information decrypted from the two dimensional code includes the radio frequency of an associated EAS RF tag embedded within the electronic ticket. If the decrypted ticket information matches or corresponds to information of a valid ticket stored on the black or white list, the Validator (10) obtains the specific radio frequency of an associated EAS RF tag embedded within the ticket. After obtaining the radio frequency of the associated EAS RF tag, the Validator (10) utilizes an Electronic Article Surveillance (EAS) transceiver (12) to detect the EAS RF tag embedded within the electronic ticket. The EAS transceiver (12) then validates the ticket. In certain embodiments, the EAS transceiver (12) validates the ticket by destroying the capacitor present within the EAS RF tag. Validation of the electronic ticket may be accompanied by an indication on the validator which provides that passage by the ticket holder is permitted or by an electronic signal which is sent to a gate allowing the gate to open for passage by the ticket holder. After the electronic ticket has been validated, the validator (10) stores information related to the validated ticket within its memory (20) to update the black list or the white list.

In certain embodiments, a master black list or a master white list is stored on a main server (not shown), which processes a list of valid and/or invalid electronic tickets. The black list or white list stored on the main server may be updated at a fixed time interval when all validators (10) are scheduled to communicate with the main server. Communication with the main server results in updating the black list or white list stored on the main server. It also results in synchronization of the black list or the white list stored on the validators (10) with the black list or white list stored on the main server. Communication with the main server may be accomplished through a communication port such as Ethernet port (22) or a wireless communication port (not shown).

The validator (10) illustrated within FIGS. 1, 2 and 6-8 may also be used for the issuance of an electronic ticket. In such embodiments, ticket information related to the purchase of the electronic ticket is entered into or received by validator (10). Entering such ticket information may be accomplished by an input such as a touchscreen, keyboard, etc. In certain embodiments, the input may be integrated as a component of the validator. In other embodiments, the input may be a device, which is separate from the validator. Information entered through the input may be performed by the ticket purchaser or by a teller operating the validator. In certain embodiments, the input may be a remote device such as a personal computer, laptop, tablet or smartphone and the ticket purchase information may be transmitted to the validator (10) through Ethernet port (22) or by a wireless signal transmitted to a wireless communication port (not shown) on the validator. After receiving the ticket information, the validator (10) will encrypt the ticket information within a two dimensional code. The validator (10) will also send an instruction to the EAS transceiver (12) to read at least one EAS RF tag embedded within a particular ticket. After reading the EAS RF tag, the validator (10) will associate the EAS RF tag information, including information related to the radio frequency of a particular EAS RF tag with the two dimensional code and will encrypt the EAS RF tag information within the two dimensional code. The validator (10) will then send a signal through an RS232/RS485 Serial Port (24) or Universal Serial Bus (USB) Port to a printer instructing the printer to print the two dimensional code directly on the electronic ticket. In alternative embodiments, the validator (10) will send a signal through a wireless communication port (not shown) to the printer instructing the printer to print the two dimensional code directly on the electronic ticket.

Figure 3:
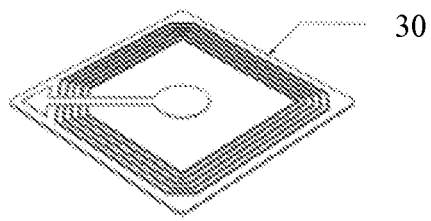
FIG. 3 is a detailed perspective view of an exemplary Electronic Article Surveillance (EAS) Radio Frequency (RF) Tag, which may be embedded within an electronic ticket.

FIGS. 3 and 4 illustrate a detailed view of an exemplary EAS RF tag (30) which may be embedded within an electronic ticket. FIG. 5 illustrates an exemplary QR code (as an example of two dimensional code) (40) which may be printed on an electronic ticket.

Figure 9:
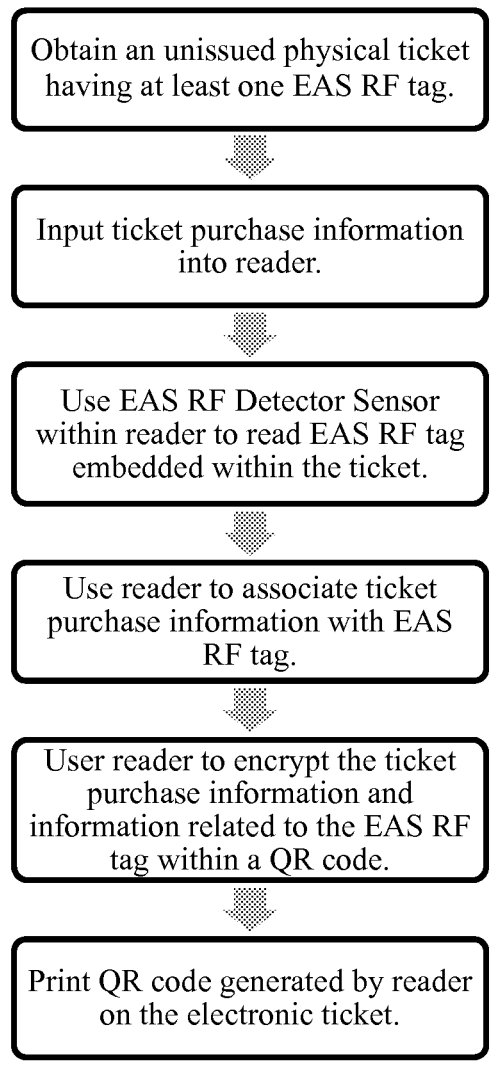
FIG. 9 is a flow chart showing exemplary steps, which may be followed to generate a hybrid single-pass electronic ticket.
Figure 10:
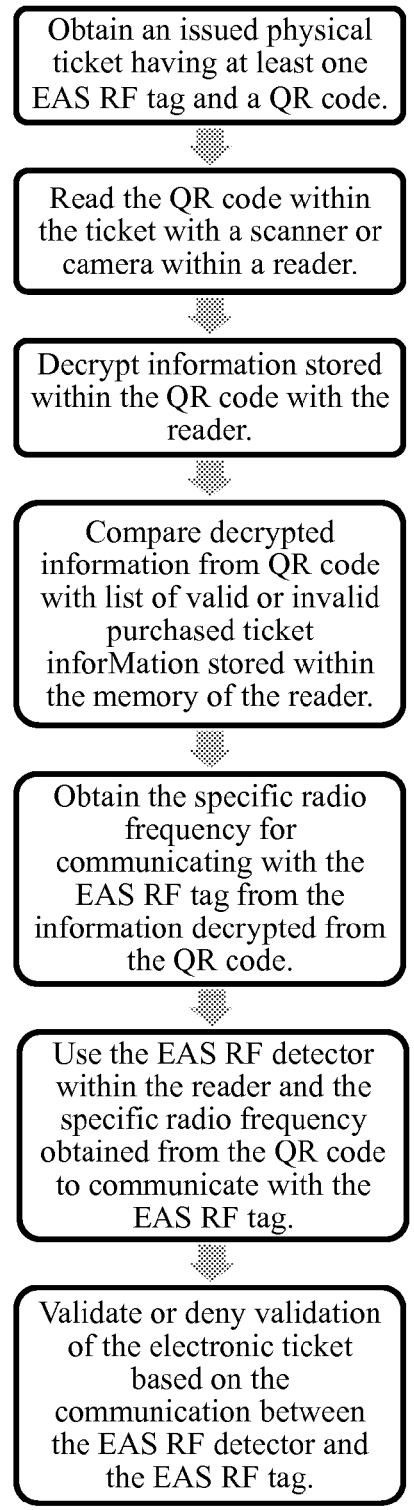
FIG. 10 is a flow chart showing exemplary steps, which may be followed to validate a hybrid single-pass electronic ticket.

FIG. 9 is a flow chart showing exemplary steps which may be followed for generating a hybrid single-pass electronic ticket. FIG. 10 is a flow chart showing exemplary steps which may be followed to validate a hybrid single-pass electronic ticket.

Numerous embodiments have been described herein. It will be apparent to those skilled in the art that the above systems and methods may incorporate changes and modifications without departing from the general scope of this invention. It is intended to include all such modifications and alterations in so far as they come within the scope of the appended claims or the equivalents thereof. The phrase "associated with" as used in this document, refers to structures which support the disclosed system and method and may also refer to structures not disclosed herein capable of supporting the disclosed system and method. Further, the "invention" as that term is used in this document is what is claimed in the claims of this document. The right to claim elements and/or sub-combinations that are disclosed herein as other inventions in other patent documents is hereby unconditionally reserved.

Having thus described the disclosed system and method, it is now claimed:

1. A system for generating a hybrid single-pass electronic ticket comprising:
   a physical ticket having at least one Electronic Article Surveillance (EAS) Radio Frequency (RF) tag;
   at least one validator comprising a processor for performing computing operations and an Electronic Article Surveillance (EAS) Radio Frequency (RF) transceiver, wherein the validator receives ticket information related to the purchase of the electronic ticket, the EAS RF transceiver reads the EAS RF tag embedded within the electronic ticket and associates the EAS RF tag with the received ticket purchase information, and wherein the validator encrypts the ticket purchase information received and information related to the EAS RF tag within a two dimensional code; and
   a printer which receives a signal transmitted from the validator to print the two dimensional code generated by the validator directly on the electronic ticket;
   wherein the system further comprises a main server for processing a list of valid and/or invalid electronic tickets and wherein the validator further comprises software and controllers for entering and processing data; at least one communication port for communicating with the main server and the printer; memory for storing ticket purchase information within a database; and a validator control board for housing and connecting the processor, memory and controllers to a bus;
   wherein the two-dimensional code is a QR code
   wherein the validator transmits a signal through the communication port to the main server, wherein the signal includes ticket purchase information related to at least one purchased ticket's serial number and
   wherein the main server receives ticket purchase information related a plurality of purchased ticket's serial numbers from multiple validators, wherein the main server processes the ticket purchase information to generate a list of valid ticket serial numbers and wherein the main server transmits the list of valid ticket serial numbers through a signal which is sent to multiple validators within the system at pre-defined time intervals allowing all validators within the system to be synchronized with respect to the list of electronic tickets which have been issued and are valid.

2. The system of claim 1, wherein the system is operated in a semi-offline or offline mode.

3. A system for validating a hybrid single-pass electronic ticket comprising:
a physical ticket having at least one Electronic Article Surveillance (EAS) Radio Frequency (RF) tag and a two dimensional code;
at least one validator comprising a processor for performing computing operations, a memory, a scanner and an Electronic Article Surveillance (EAS) Radio Frequency (RF) transceiver, wherein the scanner reads information from the two dimensional code on the electronic ticket, the validator decrypts information embedded within the two dimensional code and compares it to a list of valid or invalid purchased ticket information stored on the memory of the validator; the validator obtains a specific radio frequency for communicating with the at least one EAS RF tag and wherein the EAS transceiver uses the obtained radio frequency for communicating with the EAS RF tag to validate or deny validation of the electronic ticket
wherein the system further comprises a main server for processing a list of valid and/or invalid electronic tickets and wherein the Validator further comprises software and controllers for entering and processing data at least one communication port for communicating with the main server; and a validator control board for housing and connecting the processor, memory and controllers to a bus;
wherein the two dimensional code is a QR code;
wherein the validator comprises a communication port for communicating with the main server, further wherein the communication port is one of an Ethernet port or a wireless communication port;
wherein the validator receives a key transmitted by the main server, which is subsequently used by the validator to decrypt the QR code;
wherein validation of the electronic ticket is completed by the EAS transceiver transmitting a radio frequency signal to the EAS RF tag which destroys a capacitor embedded within the EAS RF tag;
wherein the EAS transceiver denies validation of the electronic ticket by transmitting a radio frequency signal to the EAS RF tag and sensing that a capacitor embedded within the EAS RF tag has already been destroyed; and,
wherein validation of the electronic ticket is accompanied by an indication on the validator which provides that passage by an individual presenting the ticket is permitted and wherein denial of validation of the electronic ticket is accompanied by an indication on the validator which provides that passage by the individual presenting the ticket is not permitted.

4. The system of claim 3, wherein the validator transmits a signal to a gate to open where the electronic ticket has been validated and wherein the validator transmits a signal to a gate to remain closed in the event that the electronic ticket has been denied validation.

5. The system of claim 4, wherein the validator stores ticket information related to validated tickets and ticket information related to tickets which have been denied validation within its memory and transmits such ticket information to the main server, thereby allowing the main server to update its list of valid and invalid tickets which have been issued.

6. The system of claim 5, wherein the system is operated in a semi-offline or offline mode.

7. A system for generating and validating a hybrid single-pass electronic ticket comprising:
a physical ticket having at least one Electronic Article Surveillance (EAS) Radio Frequency (RF) tag and a two dimensional code;
at least one Validator comprising a processor for performing computing operations, a memory, a scanner and an Electronic Article Surveillance (EAS) Radio Frequency (RF) transceiver,
wherein the validator generates the electronic ticket by receiving ticket information related to the purchase of the electronic ticket, utilizing the EAS RF transceiver to read the EAS RF tag embedded within the electronic ticket, associating the EAS RF tag with the received ticket purchase information, encrypting the ticket purchase information received and information related to the EAS RF tag within a two dimensional code and sending a signal to a printer to print the two dimensional code directly on the electronic ticket; and
wherein the validator validates the electronic ticket by utilizing the scanner to read ticket purchase information from the two dimensional code on the electronic ticket, decrypting the information embedded within the two dimensional code, comparing the information decrypted from the two dimensional code with a list of valid or invalid purchased ticket information stored on the memory of the validator; decrypting specific radio frequency information required for reading the at least one EAS RF tag from the two dimensional code; utilizing the EAS transceiver and the decrypted radio frequency to send a corresponding radio frequency signal to communicate with the EAS RF tag; and validating or denying validation of the electronic ticket based on the results of the EAS transceiver's communication with the EAS RF tag.

8. The system of claim 7, wherein the system further comprises a main server for processing a list of valid and/or invalid electronic tickets and wherein the validator further comprises software and controllers for entering and processing data; at least one communication port for communicating with the main server and the printer; memory for storing ticket purchase information within a database; and a validator control board for housing and connecting the processor, memory and controllers to a bus.

9. The system of claim 8, wherein the communication port for communicating with the main server is one of an Ethernet port or a wireless communication port.

10. The system of claim 9, wherein the validator comprises a first communication port comprising an Ethernet port for communicating with the main server and a second communication port comprises an RS 232/RS485 serial port or a Universal Serial Bus (USB) port for transmitting a signal from the validator to the printer to print the two dimensional code on the electronic ticket.

11. The system of claim 9, wherein the communication port is a wireless communication port through which the validator may communicate with the main server and the printer.

12. The system of claim 8, wherein the validator transmits a signal through the communication port to the main server, wherein the signal includes ticket purchase information related to at least one purchased ticket's serial number.

13. The system of claim 12, wherein the main server receives ticket purchase information related a plurality of purchased ticket's serial numbers from multiple validators, wherein the main server processes the ticket purchase information to generate a list of valid ticket serial numbers and wherein the main server transmits the list of valid ticket serial numbers through a signal which is sent to multiple validators within the system at pre-defined time intervals allowing all validators within the system to be synchronized with respect to the list of electronic tickets which have been issued and are valid.

14. The system of claim 8, wherein the two-dimensional code is a QR code.

15. The system of claim 14, wherein the validator receives a key transmitted by the main server, which is subsequently used by the validator to decrypt the QR code.

16. The system of claim 15, wherein validation of the electronic ticket is completed by the EAS transceiver transmitting a radio frequency signal to the EAS RF tag which destroys a capacitor embedded within the EAS RF tag.

17. The system of claim 16, wherein the EAS transceiver denies validation of the electronic ticket by transmitting a radio frequency signal to the EAS RF tag and sensing that a capacitor embedded within the EAS RF tag has already been destroyed.

18. The system of claim 17, wherein validation of the electronic ticket is accompanied by an indication on the validator which provides that passage by an individual presenting the ticket is permitted and wherein denial of validation of the electronic ticket is accompanied by an indication on the validator which provides that passage by the individual presenting the ticket is not permitted.

19. The system of claim 18, wherein the validator transmits a signal to a gate to open where the electronic ticket has been validated and wherein the validator transmits a signal to a gate to remain closed in the event that the electronic ticket has been denied validation.

20. The system of claim 19, wherein the validator stores ticket information related to validated tickets and ticket information related to tickets which have been denied validation within its memory and transmits such ticket information to the main server, thereby allowing the main server to update its list of valid and invalid tickets which have been issued.

21. The system of claim 20, wherein the system is operated in a semi-offline or offline mode.

22. The system of claim 7, wherein the validator further comprises an input for entering ticket purchase information.

23. The system of claim 7, wherein the validator receives ticket purchase information through a signal received by the communication port transmitted from an input device.

24. The system of claim 23, wherein the signal through which the ticket purchase information is transmitted from the input device is a wireless signal and wherein the communication port which receives ticket purchase information transmitted from the input device is a wireless communication port.

25. The system of claim 7, wherein the electronic ticket includes at least two EAS RF tags which are read at different radio frequencies and wherein information related to the specific radio frequencies for reading the at least two EAS RF tags are encrypted within the two dimensional code.

* * * * *